United States Patent
Kumar et al.

(10) Patent No.: US 8,591,799 B2
(45) Date of Patent: *Nov. 26, 2013

(54) METHODS FOR BLOW MOLDING SOLID-STATE CELLULAR THERMOPLASTIC ARTICLES

(75) Inventors: Vipin Kumar, Seattle, WA (US); Krishna V. Nadella, Seattle, WA (US); Michael Waggoner, Seattle, WA (US)

(73) Assignee: University of Washington through its Center for Commercialization, Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/430,311

(22) Filed: Mar. 26, 2012

(65) Prior Publication Data
US 2012/0183710 A1    Jul. 19, 2012

Related U.S. Application Data (63) Continuation of application No. 12/678,135, filed as application No. PCT/US2008/076242 on Sep. 12, 2008, now Pat. No. 8,168,114.

(51) Int. Cl.
B29C 49/08    (2006.01)

(52) U.S. Cl.
USPC ............. 264/532; 264/523; 264/41; 264/46.8

(58) Field of Classification Search
None
See application file for complete search history.

(56) References Cited

U.S. PATENT DOCUMENTS

| | | | |
|---|---|---|---|
| 6,162,380 A | 12/2000 | Kohn | |
| 7,169,338 B2 | 1/2007 | Imanari | |
| 8,168,114 B2 * | 5/2012 | Kumar et al. | 264/532 |
| 2009/0026198 A1 | 1/2009 | Ichikawa | |

FOREIGN PATENT DOCUMENTS

| | | |
|---|---|---|
| JP | 2002-79569 A | 3/2002 |
| JP | 2003-136585 A | 5/2003 |
| JP | 2006-124019 A | 5/2006 |
| JP | 2007-22554 A | 2/2007 |
| WO | 2007/007867 A1 | 1/2007 |

OTHER PUBLICATIONS

International Search Report mailed Mar. 17, 2009, issued in corresponding International Application No. PCT/US2008/076242, filed Sep. 12, 2008, 2 pages.

* cited by examiner

*Primary Examiner* — Monica Huson
(74) *Attorney, Agent, or Firm* — Christensen O'Connor Johnston Kindness PLLC (57) ABSTRACT

A process for producing cellular thermoplastic articles. The process comprises the steps of treating a solid parison made from a thermoplastic material with a saturating gas at an elevated pressure for a period of time to provide a gas-saturated parison; heating the gas-saturated parison to prepare a cellular parison; placing the cellular parison in a mold; and blowing a molding gas into the cellular parison to expand the cellular parison into the shape of the mold to provide a shaped cellular article.

15 Claims, 5 Drawing Sheets

METHODS FOR BLOW MOLDING SOLID-STATE CELLULAR THERMOPLASTIC ARTICLES

CROSS-REFERENCE TO RELATED APPLICATIONS

The application is a continuation of U.S. application Ser. No. 12/678,135, filed Aug. 4, 2010, now U.S. Pat. No. 8,168,114 which is the National Stage of International Application No. PCT/US2008/076242, filed Sep. 12, 2008 which claims the benefit of U.S. Provisional Application No. 60/971,844, filed Sep. 12, 2007, each application which is incorporated herein by reference in its entirety.

BACKGROUND

Blow molding is a manufacturing process used to produce hollow articles from thermoplastics. Various methods of blow molding hollow articles are known. Typically, the blow molding process begins with melting a thermoplastic material and forming a parison of the thermoplastic. The parison is then clamped into a mold and air or a gaseous medium is pumped into the parison by the use of nozzles that have been inserted into the parison. The gaseous pressure pushes the thermoplastic material outward to match the shape of the mold. Once the thermoplastic material has cooled and hardened, the mold is opened up and the article is ejected.

Various methods are known for producing cellular thermoplastic articles which are generally referred to as "foam" or "foamed thermoplastic" articles. Methods for producing cellular thermoplastic articles include, for example, the use of foaming agents that release gases that expand the thermoplastic materials at their normal processing temperatures; the use of thermoplastic materials containing liquids or solids, or both, that can be removed by extraction or dissolution; and the technique of stretching thermoplastic films containing liquids or solids, or both, to produce interfacial voids, followed by extraction or dissolution. However, the existing processes of making foamed hollow articles suffer from one common problem, which is that the foamed parisons do not have sufficient wall strength. In addition, the methods that depend on extraction or dissolution require the formation of an interconnecting network of pores that allows removal of the dissolved liquids or solids.

When molding cellular thermoplastic articles, it is important to produce uniform cell sizes. Both durability and strength of the molded articles are dependent upon cell size and uniformity. In the blow molding of cellular articles, the usual manner of controlling cell size and uniformity include altering the foaming agent, pressure and temperature of extrusion, and changes to the mixing portion of the extruder. In spite of the various efforts, a need still exists for a process to produce cellular thermoplastic articles containing pores or cells of uniform distribution.

The object of the present invention is to meet the above defined needs and provide further related advantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention provides a process for producing a cellular article from a solid thermoplastic material.

In one embodiment, the process includes the steps of:
(a) treating a solid parison made from a thermoplastic material with a saturating gas at an elevated pressure for a period of time to provide a gas-saturated parison;
(b) heating the gas-saturated parison to prepare a cellular parison;
(c) placing the cellular parison in a mold; and
(d) blowing a molding gas into the cellular parison to expand the cellular parison into the shape of the mold to provide a shaped cellular article.

The thermoplastic material includes, but is not limited to, polycarbonate, polypropylene, polyethylene, polyethylene terephthalate, polyvinyl chloride, polylactic acid), acrylonitrile butadiene styrene, or polystyrene.

The saturating gas may include carbon dioxide, nitrogen, or any combination thereof. In one embodiment, the saturating gas consists essentially of carbon dioxide. In another embodiment, the saturating gas consists essentially of nitrogen.

The solid parison may be treated with the saturating gas at the elevated pressure ranging from about 3 MPa to about 7.5 MPa. In one embodiment, the elevated pressure is about 4 MPa. In another embodiment, the elevated pressure is about 5 MPa. The treatment of a solid parison with a saturating gas can be carried out in a pressure vessel filled with the saturating gas. The treatment can proceed to complete saturation followed by a step for desorption, or alternatively, the treatment can proceed to partial saturation followed by a step for desorption.

A plurality of solid parisons may be saturated with the saturating gas simultaneously at an elevated pressure to provide a plurality of gas-saturated parisons. In one embodiment, multiple solid parisons are nested one inside another. In another embodiment, multiple solid parisons are partially nested one inside another. In yet another embodiment, each parison has a shape that is smaller at the bottom than at the top to allow nesting of one parison inside another. When multiple solid parisons are nested one inside another, the parisons can include means for enabling the saturating gas to contact the entire surfaces of all parisons. Such means can include tabs or ribs on the parisons to prevent contact.

The solid parison may include a body portion and a neck portion. In one embodiment, the neck portion further comprises screw threads.

The gas-treated parison may be heated at a temperature of about 110° C. In one embodiment, only the body portion of the gas-saturated parison is heated to provide a cellular parison having a cellular body portion and a solid neck portion.

In one embodiment, after treating with the saturating gas to achieve complete saturation and before heating, the parison is allowed to partially desorb some of the saturating gas.

A variety of inert gases may be useful as the molding gas. In one embodiment, the molding gas is selected from the group consisting of nitrogen, argon, xenon, krypton, helium, and carbon dioxide. In another embodiment, the molding gas is compressed air.

The process provides a cellular thermoplastic article comprising cells having varied sizes. In one embodiment, the cells have a size ranging from about 5 µm to about 200 µm. In another embodiment, the cells have a size ranging from about 50 µm to about 150 µm. In yet a further embodiment, the cells have a size ranging from about 50 µm to about 100 µm.

In one embodiment, the process may further comprise the step of injecting a molten thermoplastic material into a heated perform mold around a hollow mandrel blow tube to provide a solid parison before step (a).

In one embodiment, step (d) of the process may further comprise mechanically stretching the cellular parison with a plunger while blowing a molding gas into the cellular parison.

The cellular articles and processes to make them disclosed herein may be used as products, such as bottles, jars, and other containers, for example.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The disclosure relates to a process for producing a blow molded cellular article from a solid thermoplastic material. A process is disclosed that improves upon the traditional blow molding and stretch blow molding processes to provide a blow molded shaped cellular article from a solid thermoplastic material.

Figure 1:
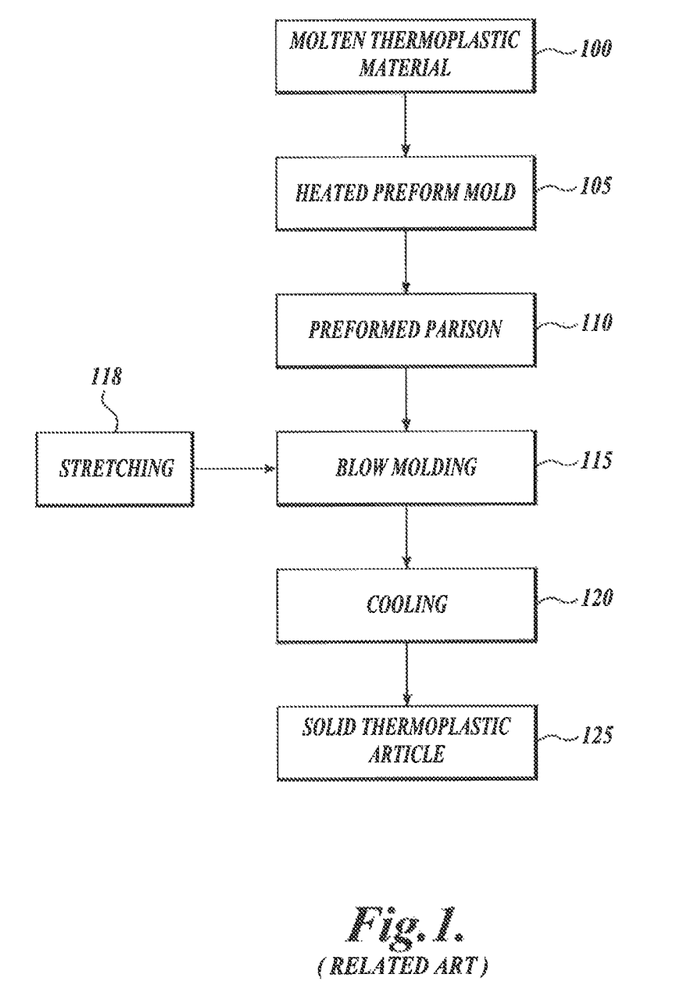
FIG. 1 shows a flow diagram of a traditional injection blow molding process and a stretch blow molding process.

The traditional process of blow molding, as diagramed in FIG. 1, can be used for the production of hollow solid thermoplastic articles such as bottles and jars. First, molten thermoplastic material 100 is injected into a heated preform mold 105 around a hollow mandrel blow tube to provide a preformed parison 110. The preform mold forms the external shape of the parison. The parison is clamped around the mandrel, which forms the internal shape of the parison. The parison usually includes a fully formed bottle/jar neck with a thick tube of thermoplastic material attached, which will form the body. Then, the parison is placed in a larger blow mold for blow molding 115. The apparatus for the blow molding step may be a preform-mandrel assembly, in which the parison is expanded with, for example, compressed air to achieve the finished article shape. Finally, after a cooling period 120, the blow mold opens and the finished shaped solid noncellular thermoplastic article 125 is removed from the assembly. Depending on the material, the parison may undergo a cooling step between the parison production and blow molding steps. This is because the material may not have the strength to go directly from a molten state to a blow molding process. Such parison is allowed to cool and then re-heated and blow molded.

Stretch blow molding is a type of blow molding, in which a parison is elongated mechanically in the mold and then expanded radially in a blowing process. Still referring to FIG. 1, in the stretch blow molding process, the molten thermoplastic material 100 flows into the heated preform mold 105 via a hot runner block, to produce the desired shape of the preformed parison 110 with a mandrel producing the inner diameter and the perform mold producing the outer shape. These preformed parisons can then be packaged, after cooling. In the stretch blow molding process, the preformed parison is heated, typically using infrared heaters, above its glass transition temperature. Then, in a blow mold, the parison is blown into the finished shaped noncellular article using high pressure air, while being stretched with a plunger as part of the process 118. The stretching of some thermoplastic materials, such as polyethylene terephthalate, results in strain hardening of the material.

A process is disclosed for producing a cellular blow molded article from a solid thermoplastic material by a modification of the blow molding and stretch blow molding processes. The process disclosed herein is applicable to both blow molding and stretch blow molding. The disclosed process includes the steps of:

(a) treating a solid parison made from a thermoplastic material with a saturating gas at an elevated pressure for a period of time to provide a gas-saturated parison;

(b) heating the gas-saturated parison to prepare a cellular parison;

(c) placing a cellular parison in a mold; and (d) blowing a molding gas into the cellular parison to expand the cellular parison into the shape of the mold to provide a shaped cellular article.

The disclosed process modifies the traditional blow molding and stretch blow molding processes by treating a solid (nonmolten) and noncellular parison with a saturating gas before the parison is heated and blow molded. For example, the solid and noncellular parison can be made in the traditional manner, but then allowed to solidify and treated with the saturating gas. The conventional injection blow molding process produces a molten not solid injection-molded parison, which is then blow molded. The disclosed process results in a blow molded cellular article.

Figure 2:
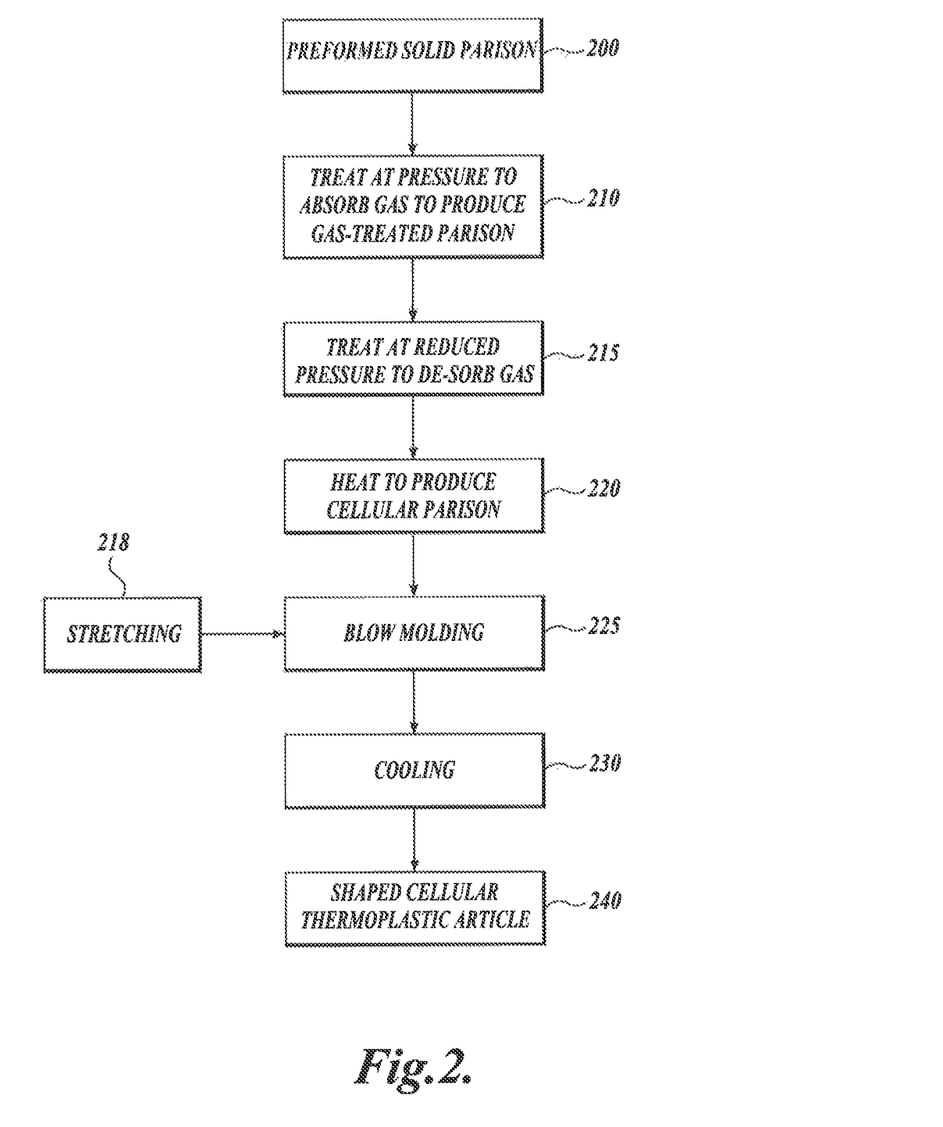
FIG. 2 shows a flow diagram of one embodiment of a blow molding process.

Referring to FIG. 2, a solid and noncellular preformed parison 200 is obtained made from a thermoplastic material using processes well-know in the plastics industry. The preformed parison 200 can be made according to the description described above in connection with FIG. 1, blocks 100, 105 and 110. The thermoplastic material can be any single thermoplastic polymer or a mixture of thermoplastic polymers including, but not limited to, polycarbonate, polypropylene, polyethylene, polyethylene terephthalate, polyvinyl chloride, poly(lactic acid), acrylonitrile butadiene styrene, and polystyrene.

From block 200, the process enters block 210. In block 210, the solid and noncellular parison is treated at an elevated pressure with a saturating gas. The treatment of the solid parison at an elevated pressure causes the thermoplastic material to absorb the saturating gas, leading to a gas-saturated parison. The treatment can proceed to complete saturation followed by a step for desorption, or alternatively, the treatment can proceed to partial saturation followed by a step for desorption. Desorption can be incidental to the process or an intentional step in the process. If the desorption is incidental, then, the desorption period is the time from removal of the parison from the heating device to the blow mold. Desorption results in lower gas concentrations which can be used to create solid surfaces where the gas concentration is insufficient to create a cellular structure. The saturating gas may be an inert gas including, but not limited to, carbon dioxide, nitrogen, or any combination thereof. In one embodiment, the high pressure saturating gas includes carbon dioxide. In one embodiment, the high pressure saturating gas includes nitrogen. The elevated pressure may be from about 3 MPa to about 7.5 MPa. In one embodiment, the elevated pressure is about 4 MPa. In another embodiment, the elevated pressure is about 5 MPa.

The treatment of the solid parison in block 210 may be carried out in a pressure vessel filled with a saturating gas. When the pressure vessel is sealed, the material is exposed to a high pressure saturating gas. The high pressure gas will then start to diffuse into the thermoplastic polymer over time, filing the thermoplastic polymer's free intermolecular volume. The gas will continue to saturate the thermoplastic polymer until equilibrium is reached. Therefore, depending on the length of time the parison is treated with the saturating gas, the parison may be fully saturated with the saturating gas. Alternatively, the parison may be partially saturated with the saturating gas. Depending on the size and thickness of the walls of the parison and the pressure of the saturating gas, the duration of treatment of the parison with high pressure saturating gas may vary from about 2 hours to about 60 days. In one embodiment, the treatment lasts from about 15 days to about 25 days. In another embodiment, the treatment lasts for about 21 days. The amount of time for complete saturation can be determined beforehand. For example, a test using the polymer parison to be blow molded can be conducted at various temperature and pressure conditions and sampled at various time intervals. The sample can be pulled from the pressure vessel and measured for weight. When the weight of the sample ceases to increase over time, the sample has reached complete saturation for the given temperature and pressure. The time can be noted, and various tables for achieving complete saturation can be created for any given combination of temperature and pressure conditions.

During treating in block 210, a plurality of solid parisons may be treated simultaneously at an elevated pressure to provide a plurality of gas-treated parisons. The parisons may be nested one inside another or partially nested one inside another. Each parison may have a shape that is smaller at the bottom than at the top to allow nesting of one parison inside another. Furthermore, the parisons can be shaped to nest inside each other in such a way that the saturating gas can come into contact with the entire surface of each parison, eliminating the need for a porous membrane between parisons From block 210, the method may alternatively proceed to block 215, desorption. Because the gas-treated parison is moved to an environment of lower pressure, the thermoplastic material of the gas-treated parison becomes thermodynamically unstable, which means that the thermoplastic material is no longer at equilibrium with the surrounding environment and that the thermoplastic material becomes supersaturated with the saturating gas. The gas-treated parison will start to desorb gas from its surface into the surrounding environment. In one embodiment, after treating with the saturating gas and before heating, the parison is allowed to partially desorb gas. The desorption of some of the gas, in some circumstances, helps to avoid creation of the cellular structure in certain areas of the parison, such as at the surface. Desorption can occur when the high-pressure saturating gas is vented from the pressure vessel or when the gas-treated parison is removed into ambient atmosphere pressure.

From block 210 and omitting step 215, or alternatively from block 215, the method proceeds to block 220, heating. In block 220, the gas-treated solid parison is heated to produce a cellular parison. The parison or parisons may be heated with any heating methods and apparatuses including, but not limited to, infrared heating and air impingement oven. Heating of the gas-treated parison in block 220 may be carried out at a temperature below the melting temperature of the thermoplastic material. The heating produces a cellular and solid parison. The cellular parison may have uniform wall thickness with nucleated bubbles formed within the parison wall. The heating temperature will depend on the type of thermoplastic materials. For example, the heating temperature may be from about 50° C. to about 175° C. for a parison made from polyethylene terephthalate; the heating temperature may be from about 50° C. to about 150° C. for a parison made from polyvinyl chloride; the heating temperature may be from about 40° C. to about 125° C. for a parison made from poly acid); the heating temperature may be from about 50° C. to about 125° C. for a parison made from acrylonitrile butadiene styrene; the heating temperature may be from about 50° C. to about 150° C. for a parison made from polystyrene, the heating temperature may be from about 50° C. to about 150° C. for a parison made from polycarbonate, the heating temperature may be from about 100° C. to about 200° C. for a parison made from polypropylene, and the heating temperature may be from about 75° C. to about 150° C. for a parison made from polyethylene. In one embodiment, the heating temperature is about 110° C. for a parison made from polyethylene terephthalate.

From block 220, the method proceeds to block 225. In block 225, the cellular parison is blow molded. Blow molding is a step in Which the cellular parison is placed in a mold and further heated to a temperature above the melting or softening point of the parison and then the parison is expanded with a molding gas into the shape of the mold to provide the finished thermoplastic cellular article. The blow molding step 225 may alternatively include mechanical stretching 218 of the parison, such as with a plunger discussed above. A person skilled in the art would readily appreciate that any inert gas could be useful as a molding gas. In one embodiment, the molding gas is compressed air. Additionally, other gases useful for expanding the cellular parison include, but are not limited to, nitrogen, argon, xenon, krypton, helium, carbon dioxide, or any combination thereof. The parison or parisons may be heated in block 225 by applying heat to the mold.

The parison heating that takes place during the blow molding step 225 may cause further formation of nucleated bubbles, i.e., foaming, in the thermoplastic material of the parison. The foaming continues during the blow molding process, resulting in a cellular thermoplastic article 240 as the finished product after a cooling period, block 230.

Figure 6:
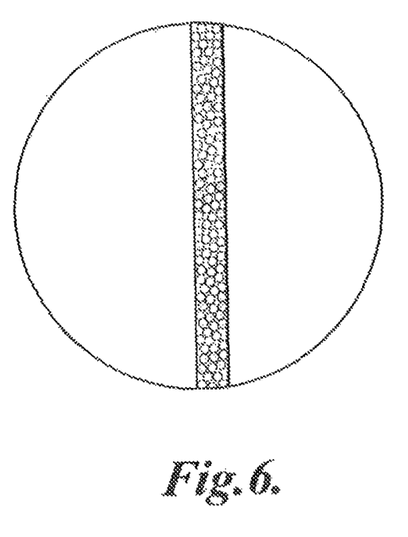
FIG. 6 is a diagrammatical illustration of a cross section of a wall of a solid blow molded cellular thermoplastic.

Referring to the diagrammatical illustration of FIG. 6, in one embodiment, the cellular thermoplastic article comprises cells having a size of from about 5 μm to about 200 μm. In another embodiment, the cellular thermoplastic article comprises cells having a size of from about 5 μm to about 150 μm. In another embodiment, the cellular thermoplastic article comprises cells having a size of from about 50 μm to about 100 μm. In a further embodiment, the cellular thermoplastic article comprises cells having a size of from about 50 μm to about 150 μm.

The process described in relation to FIG. 2 may further comprise cooling, block 230 after blow molding, block 220, the cellular article to a temperature below the melting or softening point of the shaped cellular article.

Figures 3A, 3B, 3C, 3D:
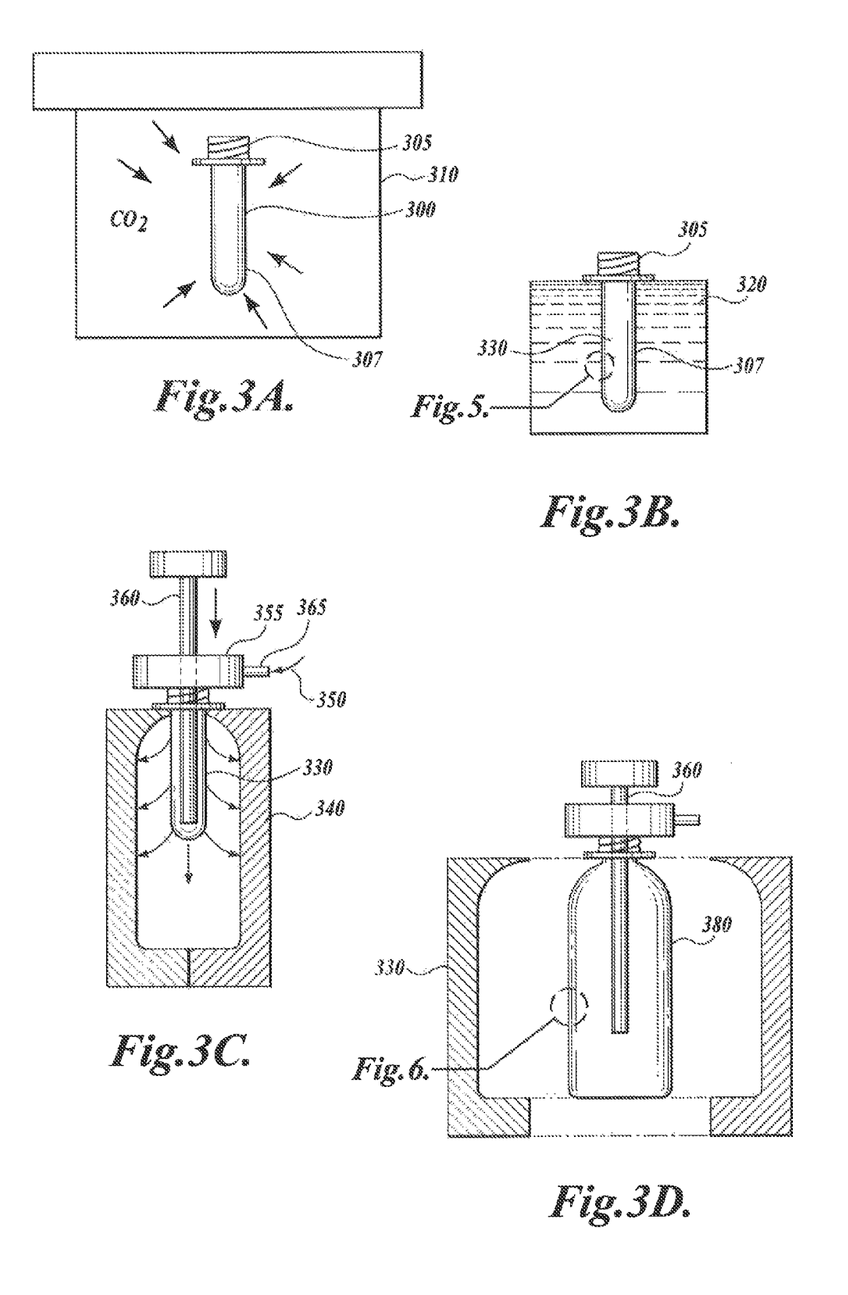
FIG. 3 shows a diagrammatical illustration of a system for producing a blow molded cellular thermoplastic article from a solid thermoplastic parison.

Referring to FIG. 3, a diagrammatical illustration of blow molding equipment is illustrated. In this FIGURE, the solid parison 300 made from a thermoplastic material is placed in the sealed pressure vessel 310 with a saturating gas $CO_2$ at an elevated pressure for a period of time. The solid parison 300 is then removed from the pressure vessel 310 and placed into a heating device 320. The heating device can be an oil bath, however, other heating apparatuses may be used. The parison foams when heated to provide a cellular and solid parison 330 with uniform wall thickness. In the embodiment shown, the solid parison 300 has a neck portion 305 and a body portion 307. The neck portion may comprise screw threads, such as would be used to produce a bottle or jar. During the heating step, only the body portion 307 is heated resulting in a cellular parison 330 having a cellular body portion 307 and a solid neck portion 305. When heating the gas-treated parison, only the body portion of the parison is heated, resulting in a cellular parison having a cellular body portion and a solid neck.

The cellular parison 330 is then clamped into a metal mold 340. The metal mold 340 may be further heated to a temperature above the softening point of the cellular parison 330. A collar 355 with an injection port 365 is attached to the neck portion of the parison 330. A hollow plunger 360 resides in and slides within the collar, such that molding gas blown through injection port 365 passes into the hollow parison, either directly into the parison or through the plunger 360 and is distributed within the interior of the parison 330 either directly through the mouth of the parison or through the plunger 360. The molding gas 350 expands the cellular parison 330 into the shape of the mold 370. The molding gas can be compressed air. When heated through the mold 340, further nucleated bubbles can form in the thermoplastic material of the parison during the blow molding process to provide a shaped cellular article 380. After blow molding, the cellular article 380 is cooled to a temperature below the softening point of the shaped cellular article and then ejected from the mold 330.

Figure 4:
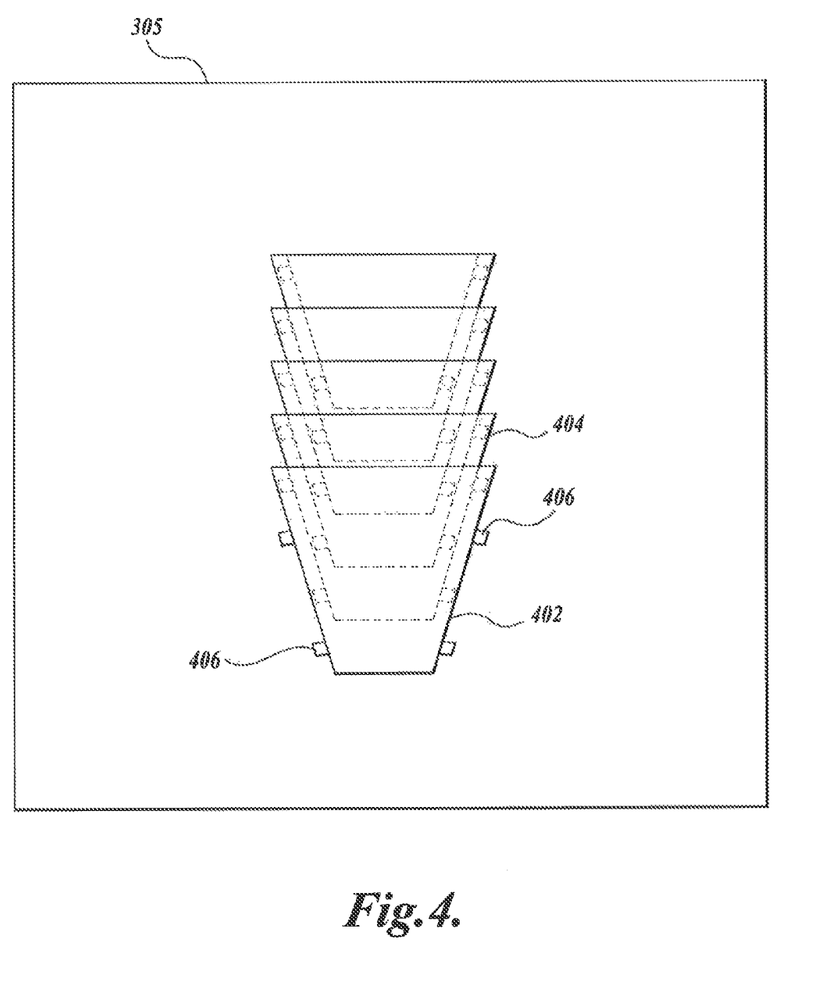
FIG. 4 is a diagrammatical illustration of a plurality of nested solid parisons.
Figure 5:
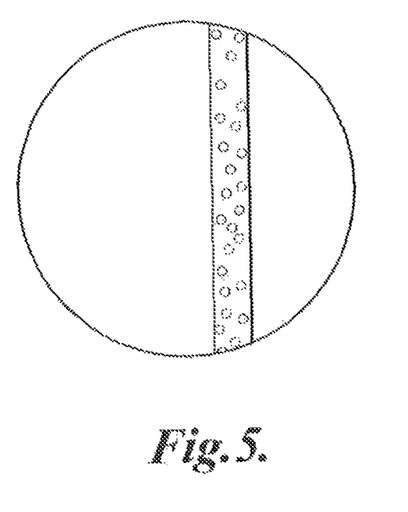
FIG. 5 is a diagrammatical illustration of a cross section of a wall of a solid cellular parison.

Referring to FIG. 4, a diagrammatical illustration of a pressure vessel 400 holding a plurality of parisons is shown. A plurality of cup-shaped parisons 402 and 404 are treated in the gas-filled pressure vessel 400. The parisons are nested inside each other with parison 404 nested inside parison 402. There are four tabs 406 on the outside wall of each parison. The tabs serve to keep a distance between the outer surface of the parison 404 and the inner surface of the parison 402 while allowing parison 404 to nest inside parison 402 stably. Therefore, the saturating gas can come into contact with the entire surface of both prison 404 and parison 402.

Compared to the traditional blow molding processes, the disclosed process provides several advantages. First, by forming a cellular thermoplastic article, the process provides material savings from using cellular instead of solid plastic. Second, the cellular thermoplastic articles, such as bottles and jars, possess excellent insulating properties, which is useful in keeping the temperature constant of the contents in the bottles or jars. For example, the cellular thermoplastic bottles and jars produced by the disclosed process have the superior property of keeping hot beverages hot and cold beverages cold. In one embodiment, the disclosed process could be used to produce cellular thermoplastic inserts for coffee bottles or jars. Third, the disclosed process may utilize conventional injection or stretch blow molding equipment with minor modifications, therefore providing a simple and efficient process for producing a cellular thermoplastic article. Fourth, the saturating gas trapped in the thermoplastic material serves as a plasticizer, allowing cooler temperatures to be used during the blow molding process, and aiding in thermoplastic stretching overall. Finally, upon the completion of the blow molding process, the saturating gas, such as carbon dioxide, trapped inside the cells of the cellular structure of the finished thermoplastic article, aids in quick cooling of the blow molded article.

EXAMPLES

Example 1

A polyethylene terephthalate (PET) parison was saturated for 21 days in a pressure vessel with $CO_2$ gas at 4 MPa. The parison was removed from the pressure vessel, allowed to desorb gas at ambient temperature and pressure for 5 minutes and heated in a heated oil bath at 110° C. for 120 seconds. The parison foamed in the oil bath to uniform wall thickness to provide a cellular parison. Large bubbles were visible. The parison retained its shape with no visible distortion from the vertical axis during the foaming process. The cellular parison was then blow molded into a hollow article using 60 psi air flow from a compressed air line. The compressed air stretched the foamed parison fully into the hollow article, creating a well formed solid-state cellular polyethylene terephthalate bottle.

Example 2

A polyethylene terephthalate (PET) parison was saturated for 21 days in a pressure vessel with $CO_2$ gas at 4 MPa. The parison was removed from the pressure vessel, allowed to desorb gas at ambient temperature and pressure for 5 minutes and heated in a heated oil bath at 110° C. for 90 seconds. The parison foamed in the oil bath to uniform wall thickness to provide a cellular parison. Large bubbles were visible. The parison retained its shape with no visible distortion from the vertical axis during the foaming process. The cellular parison was then blow molded into a hollow article using 30 psi air flow from a compressed air line. The compressed air did not fully stretch the cellular parison into the hollow article.

In example 2 the compressed air pressure was not sufficient to overcome the strength of the cellular parison's strength at that temperature and hence could not be stretched into the shape of the blow mold.

While illustrative embodiments have been illustrated and described, it will be appreciated that various changes can be made therein without departing from the spirit and scope of the invention.

The embodiments of the invention in which an exclusive property or privilege is claimed are defined as follows:

1. A process for producing a stretched cellular article from a thermoplastic material, comprising:
    (a) treating a nonmolten parison made from a thermoplastic material with a saturating gas at an elevated pressure for a period of time to provide a gas-saturated nonmolten parison;
    (b) heating the gas-saturated nonmolten parison to prepare a nonmolten cellular parison; and
    (c) stretching the nonmolten cellular parison to expand the cellular parison to provide a stretched cellular article.

2. The process of claim 1, wherein the saturating gas comprises carbon dioxide, nitrogen, or any combination thereof.

3. The process of claim 1, wherein step (b) comprises heating the gas saturated parison at a temperature below the melting temperature of the thermoplastic material.

4. The process of claim 3, wherein step (b) comprises heating the gas saturated parison at a temperature from about 50° C. to about 175° C.

5. The process of claim 1, wherein the elevated pressure is about 3 MPa to about 7.5 MPa.

6. The process of claim 5, wherein the elevated pressure is about 4 MPa to about 5 MPa.

7. The process of claim 1, further comprising injecting a molding gas into the parison during or after heating to radially expand the parison.

8. The process of claim 1, wherein the molding gas is selected from the group consisting of air nitrogen, argon, xenon, krypton, helium, and carbon dioxide.

9. The process of claim 1, wherein step (c) further comprises stretching the cellular parison with a plunger while blowing a molding gas into the cellular parison.

10. The process of claim 1, further comprising allowing the saturating gas to partially desorb after step (a) and before step (b).

11. The process of claim 1, wherein the nonmolten parison comprises a body portion and a neck portion.

12. The process of claim 11, wherein step (b) comprises heating the body portion of the gas-saturated parison to provide a parison having a cellular body portion and a noncellular neck portion.

13. The process of claim 12, wherein the heated body portion has a noncellular surface and an internal cellular structure comprising nucleated bubbles formed within the wall of the body portion.

14. The process of claim 1, wherein the cellular article comprises cells having a size of from about 5 μm to about 200 μm.

15. The process of claim 1, further comprising heating the cellular parison during step (c) to further create cells.

\* \* \* \* \*